United States Patent Office 3,032,636
Patented May 1, 1962

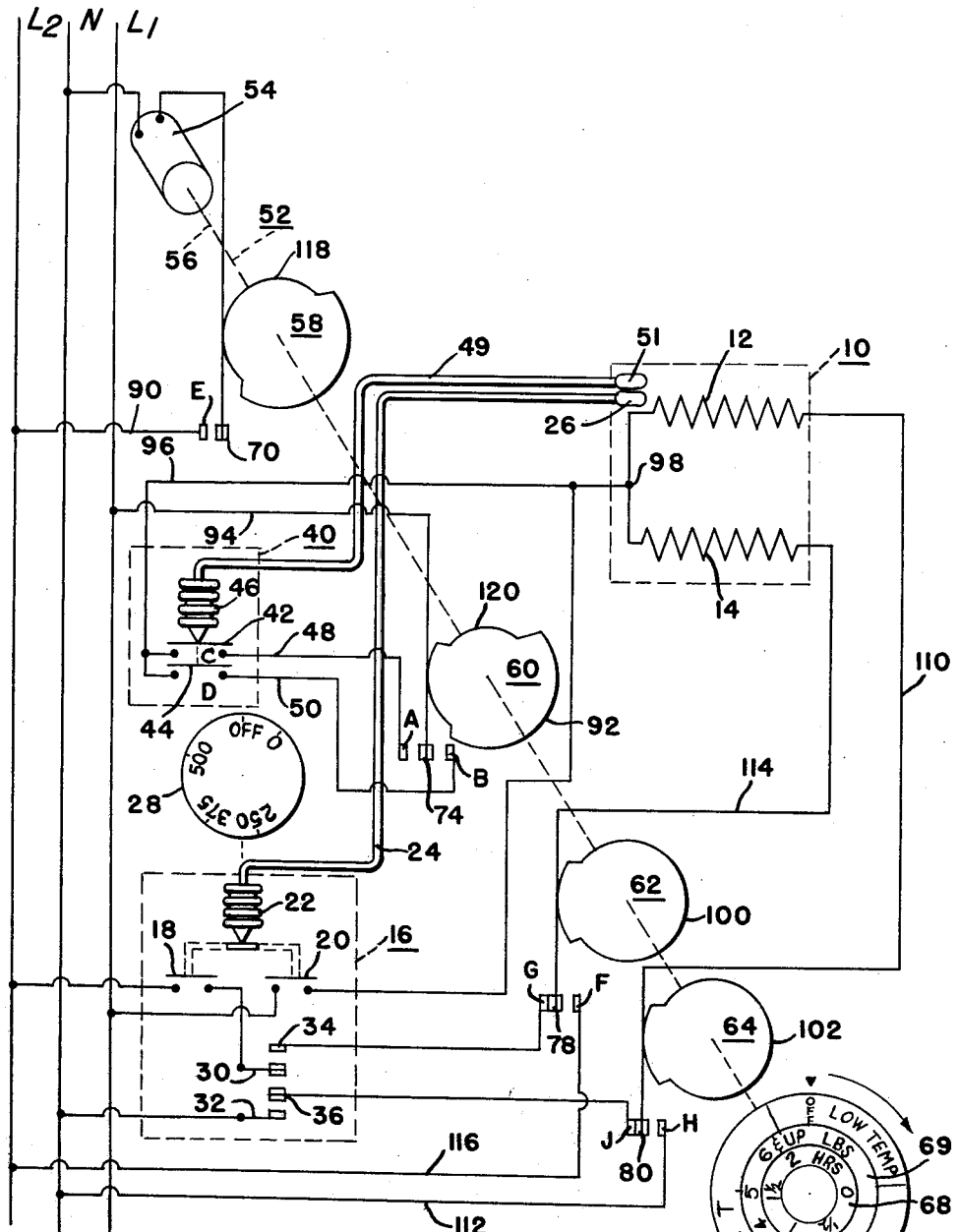

3,032,636
DOMESTIC HEATING APPLIANCE
George W. Schauer, Jr., Dayton, Ohio, assignor to General Motors Corporation, Detroit, Mich., a corporation of Delaware
Filed June 29, 1960, Ser. No. 39,547
9 Claims. (Cl. 219—20)

This invention relates to a domestic appliance and more particularly to an improved thermostatically controlled oven roasting circuit for an electric range.

Prior art studies of meat characteristics have taught that an extended roasting process at relatively low temperatures will both tenderize the meat being cooked and minimize the shrinkage thereof. This invention is directed to a control circuit for an electric range which will embody the concepts of low temperature roasting or baking in combination with a thermostatic control for roasting or making at normal high temperatures.

Accordingly, it is an object of this invention to provide a control circuit for an electric range which will effect selectively a low temperature roasting operation.

A more particular object of this invention is the provision of a control circuit for an oven which includes a high temperature thermostat and a low temperature thermostat and control means for selecting one or the other of said thermostats.

A still more specific object of this invention is the provision of a roasting control circuit for an oven including a high temperature thermostat and a low temperature thermostat wherein the low temperature thermostat includes means for browning the meat to be roasted for a predetermined period after which timed means adapts the low temperature thermostat for low temperature cooking or roasting.

Further objects and advantages of the present invention will be apparent from the following description, reference being had to the accompanying drawings wherein a preferred embodiment of the present invention is clearly shown.

In the drawings:

FIGURE 1 is a schematic wiring diagram of the control circuit of this invention in the Off position; and FIGURE 2 is a cycle chart showing positioning of the contacts illustrated in FIGURE 1.

In accordance with this invention, with reference to FIGURE 1, an electric oven is represented by the numeral 10. In the upper part of the oven 10 is a broil heating element 12 and in the lower part of the oven is a bake heating element 14. During a baking or roasting operation, the bake heating element 14 develops approximately 3000 watts on 236 volts. On the other hand, the broil heating element 12 is energized on 118 volts and develops approximately 900 watts. Total wattage for baking then becomes 3900 watts approximately which is energized intermittently in accordance with conventional cycling contacts as will be described more fully hereinafter. During a broiling operation, the bake unit 14 is deenergized and the broiling element 12 is energized at 236 volts in order to develop approximately 3600 watts. Here again, a standard thermostat will cycle during a broiling operation if sufficient temperature is reached in the oven.

To control the heat within the oven 10 during a normal high temperature baking or broiling operation, a thermostat, shown generally at 16, is supplied. Thermostat 16 includes cycling switches 18 and 20 which cycle or open and close in accordance with a hydraulic bellows 22 connected through a capillary tube 24 to a temperature sensing bulb 26 in the upper part of the oven 10. A user control knob 28 may be positioned in accordance with the baking temperature desired or to the broil position, thereby regulating the temperature at which the cycling contacts 18 and 20 will open and close. At the same time, the control knob 28 is connected mechanically with switches 30 and 32 which determine the voltage on which both the bake and broil heating elements are energized during a selected roasting operation. During a normal baking operation, the switch 30 is closed on the contact 34. But during a broil operation, the switch 30 is closed on the contact 36. During baking the switch 32 is closed on the contact 36 and during broil the switch 32 is open. In short, the baking operation provides a circuit through the switch 30 and the contact 34 and through the switch 32 and the contact 36; while during broil, a circuit exists only through the switch 30 and the contact 36.

In order to embody the concepts and advantages of low temperature roasting, a low temperature thermostat is shown generally at 40. This thermostat includes a preheat switch blade 42 and a low temperature switch blade 44—both of which are cycled by a hydraulic bellows 46 which operates through a capillary tube 48 and a temperature sensing bulb 50 in the oven 10. Although extended roasting at low temperatures will provide a meat product which is both platable and tender, the outer surface of the meat does not look appetizing in accordance with our accustomed appearance of normally roasted meats. Thus, this circuit provides means for preheating the roast so that its outer surface is browned, thereby enhancing the appearance of the finished roast. Not only does the preheating or browning process serve to improve the appearance of the roast, but it extracts just enough juices from the meat to permit a gravy to be made. These purposes are accomplished in the low temperature thermostat 40 with the preheat cycling switch 42 opening and closing the circuit 48 during this preheat or browning period. On the other hand, once the low temperature roasting circuit has been established as will be described more fully hereinafter, the low temperature cycling switch 44 will open and close a circuit 50 in parallel with the circuit 48.

As described hereinbefore, it is desirable to effect a preheat or browning period prior to the initiation of low temperature roasting. For this purpose, a timer or timing means, shown generally at 52, is included. The timing means 52 includes a timer motor 54 for pulsingly rotating a timer shaft 56. Disposed on the timer shaft 56 and rotating therewith is a timer motor cam 58, a temperature selector cam 60, a bake heating element power supply cam 62 and a broil heating element power supply cam 64. On the outer end of the timer shaft 56 may be positioned a user control knob 66 which is calibrated in time at 68 and in meat weight at 69. The positioning of the control knob 66 and, thus, the various cams is in accordance with the size and type of the meat to be roasted. Basically then, the indicia on the timer knob 66 illustrates a timed period of preheating followed by an extended timer deenergized period of low temperature roasting.

The timer motor cam 58 operates a switch blade 70 between an open position as shown in FIGURE 1 and a timer motor energized contact E. The temperature selector cam 60 is adapted to manipulate a switch blade 74 from a neutral position, as shown, to either preheat contact A or a low temperature contact B. Thus, during the preheat or browning period, switch 74 is closed on contact A. On the other hand, the switch 74 is closed on contact B during the extended low temperature operation and the switch 74 remains in its neutral position when the circuit is Off or deenergized.

In order that the boil heating element 12 and the bake heating element 14 may be selectively energized on either 118 volts and 236 volts, the bake heating element cam 62 and the broil heating element cam 64 are provided. Thus, a cam actuated switch 78 manipulated by the cam 62 moves between a contact G connected through the thermostat 16 to the power supply and a contact F which by-passes the thermostat 16. Similarly, a switch blade 80 operated by the cam 64 moves between a contact J which passes through the normal roasting thermostat 16 and a contact H which bypasses the thermostat 16.

The power supply for both the normal roasting operation and the low temperature roasting operation of this invention is provided with a pair of line conductors $L_1$ and $L_2$ and a neutral (N). With the circuitry shown in FIGURE 1, the broil element 12 and bake element 14 are deenergized as is the timer motor 54. Thus, the circuit is completely deenergized in a non-operating position. If a normal high temperature baking operation is desired, the user will merely rotate the user knob 28 to the desired temperature. As soon as the knob 28 is turned to one of the roasting or baking temperatures, the switch 30 will be closed on the contact 34 and the switch 32 will be closed against the contact 36. The cycling switches 18 and 20 will be opening and closing in accordance with the operation of the bellows 22 sensing the temperatures within the oven 10. In this circuit relationship, the broil heating element 12 will be energized for 118 volts and the bake heating element will be energized for 236 volts as mentioned hereinbefore.

With the knob 28 rotated into the Broil position, the manipulation of the knob 28 will mechanically close the internal switch 30 of the thermostat 16 on the contact 36, i.e. both switch 32 and contact 34 will be open during this operation. In this relationship, the broil heating element 12 is energized on 236 volts and the bake heating element 14 is deenergized. The foregoing explanation of the operation of a normal roasting circuit is believed conventional and is set forth merely as a help in understanding the interrelationship of the circuits as the low temperature circuit of this invention is explained next following.

In operation, let us assume the operator wishes to roast a pork loin in a manner which will achieve the maximum tenderness and the minimum wastage. In accordance with the size of the roast, she will preselect a period of browning on the dial indicia 68. This dial may be coordinated with the weight of a particular roast of meat as shown or the timing may be picked from a chart supplied with the circuitry. In any event, such interrelationship of time and meat weight and type can be established by empirical study. As soon as the knob 66 is rotated manually, counterclockwise into the preheat time indicia of the knob, the timer motor 54 will be energized when the cam 58 biases the swtich 70 into engagement with the contact E. Power at 118 volts will flow from $L_2$ through line 90, contact E, cam switch 70, the timer motor 54 to the neutral (N). With this energization, the cam shaft 56 will start intermittently or pulsatingly rotating the various cams through the timed preheat period. It will be noted in FIGURE 2 that the relationship of the various contacts A, B, C, D, E, F, G, H and J is set forth— the indication X indicating a closed contact and the indication C a cycling contact or one that is being opened and closed intermittently in accordance with a sensed temperature.

During the preheat portion of this low temperature cooking operation, a cam portion 92 will be biasing the switch 74 into engagement with the preheat contact A. Thus, the heating elements 12 and 14 will be energized from $L_1$, line 94, timer switch 74, contact A, line 48, the cycling preheat switch 42, line 96 to a juncture 98 at the heating elements 12 and 14. At the same time that the cam 60 is establishing the preheat contacts C as controlling in the low temperature thermostat 40, the cams 62 and 64 are biasing the timer switches 78 and 80, respectively, by their cam portions 100 and 102. This positioning of timer switches 78 and 80 will set up a circuit which by-passes the normal high temperature roasting thermostat 16. Thus, switch 78 is closed on contact F and switch 80 is closed on contact H. In this circuit relationship, the bake and broil heating elements 12 and 14 operate on 236 volts and 118 volts, respectively, as follows. From the junction point 98 which is connected through the low temperature control thermostat 40 to $L_1$, the broil heating element is energized by means of a line 110 connected to the timer switch 80, the contact H and by way of line 112 to the neutral (N) side of the line. At the same time, the bake heating element 14 is energized from the junction 98 by means of line conductor 114 connected to the timer switch 78, the by-pass contact F and line 116 to $L_2$. During the preheat operation, the broil and bake heating elements will cycle on and off in accordance with a factory preset temperature of approximately 325° F. for the preheat cycling contacts C. At the same time, the timer motor shaft 56 will be progressing through the timed cycle selected. When the cams rotate to the conclusion of the preheat period, a low temperature roasting operation will be automatically established.

During the low temperature roasting operation, the timer switch 70 is biased by the cam portion 118 on cam 58; the timer switch 74, by the cam portion 120 on cam 60; the timer switch 78, by the cam portion 100 on cam 62 and the timer switch 80, by the cam portion 102 on cam 64. In this relationship, the contacts B, F and H are closed and the contacts C and D are cycling. Of course, since a circuit has been established through the low temperature cycling contact D and switch 44, the preheat cycling contact 42 is out of the circuit and ineffective. Note that the timer motor 54 has been deenergized at the start of the low temperature roasting operation. Since this operation lasts for extended periods up to approximately twenty-four hours, the exact time that the extended roasting period at low temperature is terminated is relatively unimportant. This invention contemplates a manual turning off of the oven when it is desired to serve the roast. An error of several hours is unnoticeable in the results of this low temperature cooking operation. However, it is within the purview of this invention to include means which could terminate the low temperature cooking operation by some automatic means within the skill of the art.

During low temperature roasting, the broil and bake heating elements are energized as follows. Power flows from $L_1$ through the line 94, the timer switch 74, the low temperature contact B, line 50, cycling contacts D and switch 44, line 96 to the heating element juncture 98. From this point, the broil heating element 12 is energized by way of line 110, timer switch 80, by-pass contact H in line 112 to the neutral (N) side of the line for 118 volt operation. At the same time, the brake heating element 14 is energized by way of line 114, timer switch 78, by-pass contact F and the line 116 to the other side of the line $L_2$. It should be obvious that the bake heating element 14 may be energized on 118 volts during the low temperature roasting operation by connecting the line 116 to the neutral (N) instead of the other side of the line. To accomplish the most desirable low temperature roasting operation, the low temperature thermostat 40 is factory preset so that the cycling switch 44 is opened and closed when the bulb 50 senses the approximately 160° F. in the oven 10. The 160° F. temperature may vary somewhat but in no case should the low temperature roasting be accomplished above 170° F.—the temperature above which the meat becomes toughened.

It should now be seen that an improved circuit has been taught wherein a low temperature roasting circuit is placed in combination with a conventional high temperature roasting circuit to provide a low temperature roasting period preceded by an automatically terminated, predetermined period of browning.

While the embodiment of the present invention as herein disclosed, constitutes a preferred form, it is to be understood that other forms might be adopted.

What is claimed is as follows:

1. A control circuit for an oven having a bake heating element and a broil heating element adapted for high and low heat output and in parallel circuit relationship comprising, a power supply, a high temperature thermostat for controlling said heating elements during a normal high temperature operation, a low temperature thermostat having a first switch accurately responsive to a low temperature in said oven and a second switch accurately responsive to a high temperature in said oven, said switches being in parallel circuit relationship with each other and in series circuit relationship with said heating elements, third switch means for connecting one of said first and second switches with said heating elements and with said power supply, fourth switch means for selectively connecting said broil heating element to said power supply through said high temperature thermostat, fifth switch means for selectively connecting said bake heating element to said power supply through said high temperature thermostat, and timer means for controlling said third, fourth and fifth switch means in a manner to energize said broil heating element for low heat output and said bake heating element for high heat in series with said second switch during a preheat operation and said timer means automatically terminating said preheat operation and controlling third, fourth and fifth switch means in a manner to energize said broil heating element for low heat output and said bake heating element for high heat output in series with said first switch during an extended low temperature operation.

2. An automatic roasting control for effecting a normal high temperature cooking operation or a preheat cooking operation and a low temperature roasting operation in an oven having a bake heating element and a broil heating element comprising; a power supply having a first and second line conductors and a neutral; a low oven temperature thermostat having a low temperature switch responsive to a low temperature in said oven and a high temperature switch responsive to a high temperature in said oven; said high and low temperature switches being in parallel with each other and in series with said heating elements; a high oven temperature thermostat connected to said heating elements in parallel circuit relationship to said low oven temperature thermostat and having first, second, third and fourth switches; said first and second switches being responsive to temperatures in said oven during said normal cooking operation; a timing means having a timer motor, a cam shaft operated by said timer motor, a cam shaft actuated switch connected through said timer motor to said neutral, a preheat or low temperature roasting operation selector cam shaft actuated switch connected to said first line conductor and operated between a low temperature switch contact and a high temperature switch contact, a bake heating element power supply cam shaft actuated switch connected to said bake heating element and operating between a first contact connected to said third switch and a first by-pass contact connected to said second line conductor; a broil heating element power supply cam shaft actuated switch connected to said broil heating element and operating between a second contact connected to said fourth switch and a second by-pass contact connected to said neutral; a timer motor contact selectively engageable by said timer motor cam shaft actuated switch and connected to one of said first and second line conductors; said timing means adapted to connect said heating elements to said power supply through said by-pass contacts and said high temperature switch during said preheat operation and to automatically connect said heating elements through said by-pass contacts and said low temperature switch at the termination of a predetermined timed preheat period.

3. In combination with an oven, a circuit for high or low temperature oven roasting comprising, heating means for said oven, a first thermostat accurately responsive to high temperatures in said oven for thermally responsively controlling said heating means during high temperature roasting, a second thermostat in parallel circuit relationship to said first thermostat for selectively thermally responsively controlling said heating means during low temperature roasting, said second thermostat having a preheat switch preset to deenergize said heating means at a fixed predetermined temperature in said oven and a low temperature switch accurately responsive to low temperatures in said oven, and timing means for selectively by-passing said first thermostat and for conditioning one of said switches for control of said heating means.

4. The circuit of claim 3 wherein said timing means includes a presettable low temperature roast indicator having a low temperature portion and a preheat portion, said preheat portion being coextensively calibrated in roast weight and time.

5. In combination with an oven, a control for oven heating means in a low temperature roasting circuit comprising, a first thermostat having first and second cycling switches in series with said heating means and in parallel with each other, said first cycling switch preset to cycle said heating means at a fixed predetermined temperature in said oven, said second cycling switch calibrated to respond accurately to low temperatures in said oven, a second thermostat having a third cycling switch in series with said heating means and in parallel with said first and second cycling switches, said third cycling switch calibrated to respond accurately to high temperatures in said oven, and means for selectively placing one of said switches in control relationship with said heating means.

6. An automatic roasting control for effecting a normal high temperature cooking operation or a preheat cooking operation and a low temperature roasting operation in an oven having a heating element comprising; a power supply having first and second line conductors and a neutral; a low oven temperature thermostat having a low temperature switch responsive to a temperature below approximately 170° F. in said oven and a high temperature switch responsive to a temperature above approximately 170° F. in said oven; said high and low temperature switches being in parallel with each other and in series with said heating element; a high oven temperature thermostat connected to said heating element in parallel circuit relationship to said low oven temperature thermostat; a timing means having a timer motor, a cam shaft operated by said timer motor, a cam shaft actuated switch connected through said timer motor to said neutral, a preheat or low temperature roasting operation selector cam shaft actuated switch connected to said first line conductor and operating between a low temperature switch contact and a high temperature switch contact, a heating element power supply cam shaft actuated switch connected to said heating element and operating between a first contact connected to said high oven temperature thermostat and a first by-pass contact connected to said second line conductor; a timer motor contact selectively engageable by said timer motor cam shaft actuated switch and connected to one of said first and second line conductors; said timing means adapted to connect said heating element to said power supply through said by-pass contact and said high temperature switch during said preheat operation and to automatically connect said heating element through said by-pass contact and said low temperature switch at the termination of a predetermined timed preheat period.

7. An automatic roasting control for effecting a normal high temperature cooking operation or a preheat cooking operation and a low temperature roasting operation in an oven having a heating element comprising; a power supply having first and second line conductors and a neutral; a low oven temperature thermostat having a low temperature switch responsive to a temperature below approximately 170° F. in said oven and a high temperature switch responsive to a temperature above approximately 170° F. in said oven; said high and low temperature switches being in parallel with each other and in series with said heating element; a high oven temperature thermostat connected to said heating element in parallel circuit relationship to said low oven temperature thermostat; a timing means having a timer motor, a cam shaft operated by said timer motor, a cam shaft actuated switch connected through said timer motor to said neutral, a preheat or low temperature roasting operation selector cam shaft actuated switch connected to said first line conductor and operating between a low temperature switch contact and a high temperature switch contact, a heating element power supply cam shaft actuated switch connected to said heating element and operating between a first contact connected to said high oven temperature thermostat and a first by-pass contact connected to said neutral; a timer motor contact selectively engageable by said timer motor cam shaft actuated switch and connected to one of said first and second line conductors; said timing means adapted to connect said heating element to said power supply through said by-pass contact and said high temperature switch during said preheat operation and to automatically connect said heating element through said by-pass contact and said low temperature switch at the termination of a predetermined timed preheat period.

8. In combination with an oven, a control for oven heating means in a low temperature roasting circuit comprising, first and second cycling switch means in series with said heating means and in parallel with each other, said first cycling switch means preset to cycle said heating means at a fixed predetermined temperature in said oven, said second cycling switch means calibrated to respond accurately to low temperatures in said oven, third cycling switch means in series with said heating means and in parallel with said first and second cycling switch means, said third cycling switch means calibrated to respond accurately to high temperatures in said oven, and means for selectively placing one of said switch means in control relationship with said heating means.

9. In combination with an oven, a control for oven heating means in a low temperature roasting circuit comprising, first and second cycling switch means in series with said heating means and in parallel with each other, said first cycling switch means preset to cycle said heating means at a fixed predetermined temperature in said oven, said second cycling switch means calibrated to respond accurately to low temperatures in said oven, third cycling switch means in series with said heating means and in parallel with said first and second cycling switch means, said third cycling switch means calibrated to respond accurately to high temperatures in said oven, and timing means for selectively placing one of said switch means in control relationship with said heating means for a predetermined timed period.

References Cited in the file of this patent

UNITED STATES PATENTS

| | | |
|---|---|---|
| 2,767,293 | Jordan et al. | Oct. 16, 1956 |
| 2,798,929 | Wojcik | July 9, 1957 |
| 2,870,313 | McCormick | Jan. 20, 1959 |